United States Patent [19]

Skelton et al.

[11] Patent Number: 4,459,662
[45] Date of Patent: Jul. 10, 1984

[54] MICROCOMPUTER HAVING ROM MASS MEMORY FOR DOWNLOADING MAIN RAM MEMORY WITH MICROCOMPUTER INSTRUCTIONS

[75] Inventors: Charles W. Skelton, Cypres; Patricia L. Roddy, Houston; David L. Flower, Houston; David S. Laffitte, Houston, all of Tex.

[73] Assignee: Texas Instruments Incorporated, Dallas, Tex.

[21] Appl. No.: 191,892

[22] Filed: Sep. 29, 1980

[51] Int. Cl.³ .............................................. G06F 3/00
[52] U.S. Cl. ................................................. 364/200
[58] Field of Search ................................ 364/200, 900

[56] References Cited

U.S. PATENT DOCUMENTS

| | | | |
|---|---|---|---|
| 3,609,665 | 9/1971 | Kronies | 364/200 |
| 3,786,433 | 1/1974 | Notley | 364/200 |
| 3,962,683 | 6/1976 | Brown | 364/200 |
| 4,030,073 | 6/1977 | Armstrong, Jr. | 364/200 |
| 4,138,718 | 2/1979 | Toke | 364/200 X |
| 4,144,563 | 3/1979 | Heuer | 364/200 |
| 4,180,862 | 12/1979 | Seipp | 364/900 |
| 4,199,814 | 4/1980 | Rapp | 364/900 X |
| 4,204,206 | 5/1980 | Bakula | 364/900 X |
| 4,268,901 | 5/1981 | Subrizi | 364/200 |
| 4,291,388 | 9/1981 | Ecker, Jr. | 364/900 |
| 4,344,127 | 8/1982 | McDaniel | 364/900 X |
| 4,348,729 | 9/1982 | Sasayama | 364/900 X |

Primary Examiner—Errol A. Krass
Attorney, Agent, or Firm—Thomas G. Devine; Leo N. Heiting; Melvin Sharp

[57] ABSTRACT

A microcomputer system has a microprocessor whose functions are implemented by instructions and data from a directly connected random access memory (RAM). The capacity of the RAM is less than the typical total instruction list for the microprocessor. A read-only mass memory is connected to the RAM and has permanently stored instructions set therein for the microprocessor. A controller controls the flow of instructions from the mass memory to the RAM as required and also controls the flow of instructions and data between the RAM and microprocessor. The instructions from the mass memory are overlayed in the RAM in areas no longer required for instruction execution.

11 Claims, 13 Drawing Figures

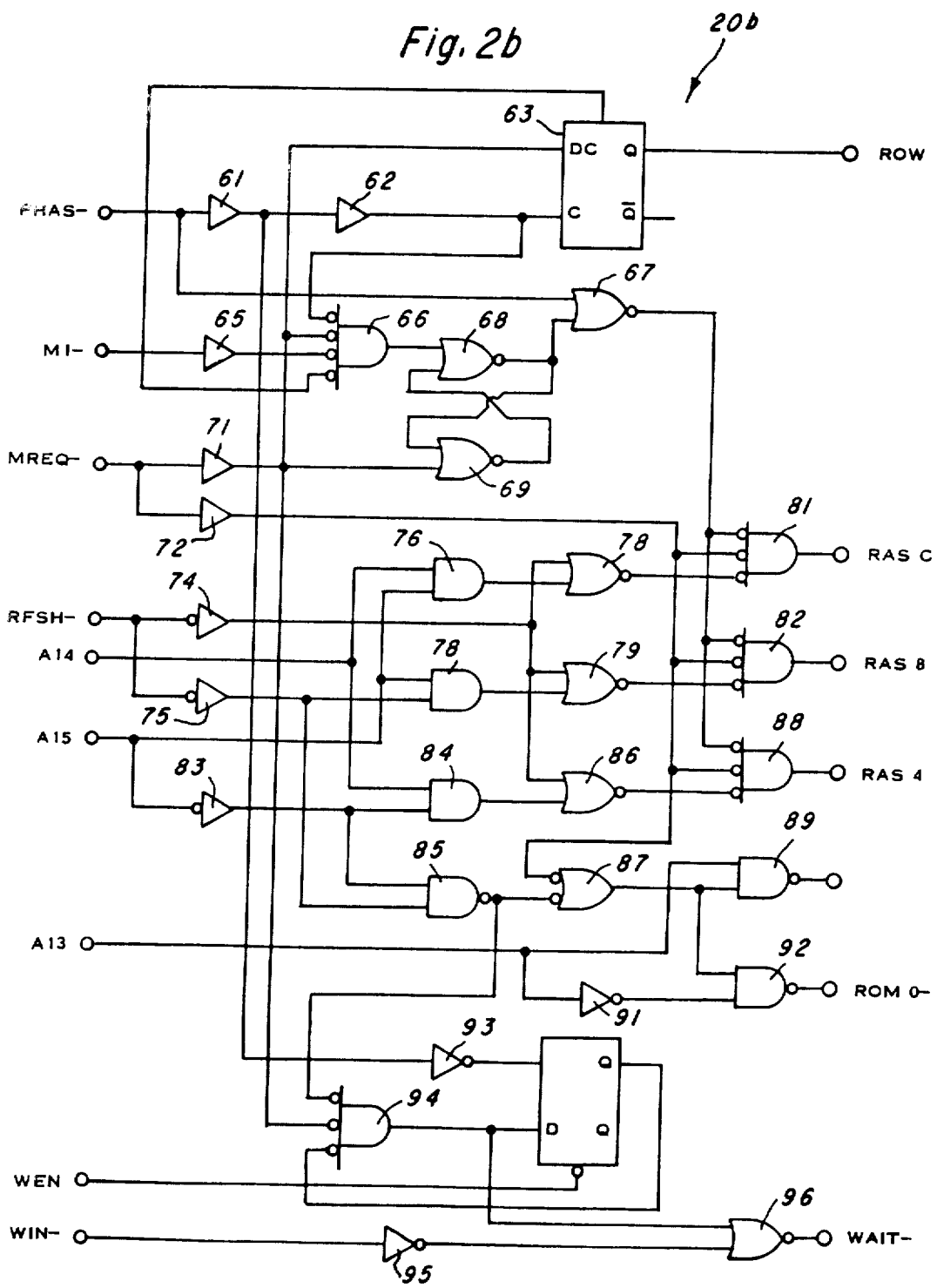

Fig. 3a $$
\begin{aligned}
&\text{\$\$}\\
&\text{\$\$}\\
&:10000000FD360403FD7409FD7508FD700BFD360611\\
&:10001000000FDE5FDE5E10E001E00CDA901FDE1FDBD\\
&:10002000E50E00FD5E0716FFCDA901FDE1C978B917\\
&:10003000C0AFB8C81ABEC0231310F9AFC91101A0D0\\
&:100040006084F79ADCB3CCB1DE60128067CAA679C\\
&:100050007DAB6FCB3910EC23C9110000D57EE3C511\\
&:10006000CD3D00C1E3EDA1EA5D00E17DB4C9E5CD80\\
&:100070009F01E1DD360500DD7E0491B83005D1C376\\
&:100080008605D5DD360500C9AFB837C87EFE20200D\\
&:1000900005231 0F837C90DFAA4007EFE2028ED23B1\\
&:1000A0001 0F837C9E50C7EFE2028042310F70CE178\\
&:1000B00041AFC9E5C5AFB8231D1AFE803048BE283B\\
&:1000C00011CB79283BFE403837FE5E3033C620BE68\\
&:1000D000202E132310E31AFE803825C1E1201D13C2\\
&:1000E0001AFE8030174F131AFE813804AFC9131A55\\
&:1000F000FE8038FA2006131AFE8038EAF6FF37C968\\
&:10010000131AFE8038FAC1E120F2131AFE8030EC97\\
&:10011000131AFE81389DF6FFC9DDCB0676200BDD74\\
&:10012000E5E10E00DD5E07CDA901DDCB06BEC9B855\\
&:100130003013CB27CB27853001246F5E2356234E07\\
&:100140002346EBAFC9F601C9FD360400FD7409FD75\\
&:100150007508FD7006FD360A00FD360B00FDE5FD55\\
&:10016000E5E10E001E00CDA901FDE1FDE50E00FD5B\\
&:100170005E0716FFCDA901FDE1C9FD360401FD367C\\
&:10018000600FDE5FDE5E10E001E00CDA901FDE143\\
&:10019000FDE50E00FD5E0716FFCDA901FDE1C9FDDD\\
&:1001A0006605FD6E04E5DDE1C9E5D5C5FD2100006C\\
&:1001B000FD39CD0000C1D1E1C9FD360402FD700654\\
&:1001C000FD7409FD7508FD710BFD720DFD730CFDCD\\
&:1001D000E5FDE5E10E001E00CDA901FDE1FDE50E06\\
&:1001E00000FD5E0716FFCDA901FDE1C9FD7E01FE00\\
&:1001F0001BC97ACDF7017BF50F0F0F0FCD0002F170\\
&:10020000E60FC69027CE40277723C9AFB837C8CBB3\\
&:100210003808D8CD1B02D8121310F8C97ECD2E02D8C3\\
&:1002200000707074F237ECD2E02D823B1C9D6304A\\
&:10023000D8C6E9D8C606F23C02C607D8C60AB7C96E\\
&:10024000DDE5E5780D60547280A3808CB7920047122\\
&:100250002310FCE5DDE1EB111027CD820211E8034C\\
&:10026000CD8202116400CD8202110A00CD8202CD3E\\
&:10027000A002DDE5E1D1B7ED5245EBDDE3D13E80F3\\
&:10028000B9C93E80B93821AF3CED5230FB193D2051\\
&:1002900015CB79280204C904C8F8DD7100DD23C933\\
&:1002A0003E80B938037D0E3081042809FAB502DD9D\\
&:1002B0007700DD23C90EAAC9AF4F1803AF0E80EB3C\\
&:1002C000676FB828461AFE2020051310F8183CCB9B\\
&:1002D0007928101AFE2B2806FE2D2007CBF11305D6\\
&:1002E0008291AD6303804FE0A3804CBE118EFCB9F\\
&:1002F000D9D529380F545D29380A29380719380407\\
&:100300016005F19D130D7CBE918D337CB69C0CBF2\\
&:1003100061C0CB59C8AFCB79C87C17D8CB71C81195\\
&:10032000000EBED52AFC9CDAE04DD5601DD5E003D\\
&:10033000DD7E03DD770ADD770BDD7709CD950320C0\\
&:100340001DDDCB02462820215203E5DD6607DD6E68\\
&:100350006E921D704CD0000FE08F40000E9DD7EA7\\
&:100360000BDD7703C3FF0321DF04CDCF060E07CDDE\\
&:10037000C203C33C03DD7E0BDDBE0528F026006F03\\
&:100380001971CDCB03DD7E0BDDBE0A2003DD340AFF\\
&:10039000DD340B18A7CDCD04FD360402FD36060072\\
&:1003A000FDE5D5FDE5E10E001E00CDA9010E00DD45\\
&:1003B0005E0816FFCDA901D1FDE1FD7E05B7DD4E3A\\
\end{aligned}
$$

Fig. 3b

```
:1003C0000CC9CDCD04FDCB06861807CDCD04FDCBE1
:1003D00006C6FD360403DD710CD5FDE5E10E001EF9
:1003E00000CDA9010E00DD5E0816FFCDA901D1C91F
:1003F000DD7E0BDD7703DD770ADDBE04DA6D03AF4A
:100400000C9CD1B04DD7E0ADD770318EDDD7E0BDD33
:10041000BE0ACA6D03CD1B04C33C03DD7E0BDDBEEB
:100420000AC826006F194EDD340BCDCB0318ECDD66
:100430007E0BB7CA6D03DDBE09281SDDBE0928137F
:100440003D26006F194F7EFE2020037918EDOE0A1D
:10045000CDC203DD460BAFDD770BDD77090E080556
:10046000FA3C03CDC20318F7DD7E0BB7CA6D03DD7E
:10047000BE09200EDD3509DD350B0E08CDC203C3E4
:100480003C033D4726006F197EFE2028EADD7009F7
:10049000E0ACDC20318E0DD7E0BDDBE0ACA6D0375
:1004A00026006F194EDD340BCDCB03C33C03CDCDFD
:1004B00004DD7E08FD7707DDE5E1110C0019FD7410
:1004C0009FD7508FD360B01FD360600C9DD660F16
:1004D000DD6E0EE5FDE1C967033C030104F0030096
:1004E0008075038D8EF0038889F00383842F048444
:1004F00085680485869704868704FF21001ECD3D
:0B050000F70121FA1D060CCD0000C918
:0C1DFA0000002A2A2A200000202A2A2AA1
:10050B00AFBA28060611BC2004EB06095378444DFC
:10051B002100003DC829CB23CB1230F70918F4AFCB
:10052B0047676FB9C806082917CB21300319CE00CE
:10053B0010F547C9AFBA2004BB37C8BA474F3808C4
:10054B003CCB23CB12F24B053CCB21CB10ED5238DD
:10055B00030C180119CB3ACB1B3D20EDC978B93FE1
:10056B00D8061118022917CB23CB129138031C186C
:10057B00018110F1C9BE2330062323CD9A05E97EF4
:10058B0023666FE9856F7CCE00677EFEFF3FC9D582
:10059B0016005FEB29195E2356EBD1C91E00BEC8AE
:1005AB00D81C2318F91600197EC9160019197E23B9
:1005BB00666FC923BED82320FA7EC923BED823BEBB
:1005CB002330F886B7C92323BED82320F918092373
:1005DB0023BED823BE2330F77E23666FE3C9AFB8A3
:1005EB0037C87BBE200D237ABE2008235E235623FB
:1005FB0005AFC923232310EA37C9FD6E00FD660141
:10060B00F3FD7504FD7405FD7506FBFD7407C9FD4F
:10061B006603FD6E02F3FD5605FD5E04FB13B7ED9D
:10062B00522006FD5601FD5E00B7F3FD6607FD6E19
:10063B0006FBED52C8EBF3FD7405FD7504FB70C9A9
:10064B00AFF3FD5607FD5E06FD6605FD6E04FBED83
:10065B0052C813FD6603FD6E02AFED522006FD5628
:10066B0001FD5E00EBF3FD7407FD7506FB463DC90E
:10067B00E5216F1EF3AE180FE5216F1EF3B61807B9
:10068B00E5216F1E2FF3A67723CB7E2002D388FBA9
:10069B00E1C9FD6E00FD6601FD7504FD7405C9CD54
:1006AB00B606D871C9CDB606D84EC9FD6603FD6E28
:1006BB002FD5605FD5E0413B7ED52D8EBFD740534
:1006CB00FD7504C93EFFBE280E79BE23380ABE3025
:1006DB007237E23666FE3C923232318E716012123
:1006EB0040ACD250BFD210C1ECD0000FD21061E9D
:1006FB00CD0000FD6605FD6E04E5DDE1DDCB06EE0C
:10070B003A751EB72808DD7E02FE00C29707DD365C
:10071B000500DDCB06AEDD7E04213807CD0000FEE3
:10072B0008F23107EBE9DD360500C3970797079700A
:10073B000731074007DD6E0BAFDD770ABD284DDB6
:10074B00E5DDCB06CEE1FD21191EFD7407FD750617
:10075B00FD361200FD361F001106001911191E017E
:10076B00600F3EDB0FBFD210E1ECD00001601219E
:10077B003408F3DDCB0B7ECC250BFBC9FD21191EF9
```

Fig. 3c

```
:10078B00FD7E04DD770AFD7E1FDD7705FD21161E3C
:10079B00CD0000FD21191EAFFD7707FD7706DDCBE0
:1007A B00066E280CDD7E0ADDBE0B2804DD36050047
:1007BB00DDCB06AECD1901C3F7063DC03E000E00E2
:1007CB00CD0A0DDD21191EDD6607DD6E067CB5C871
:1007DB00E5DDE1DDCB06EEDD21191EF3DD3605008F
:0207EB00FBC948
:101E060000000FF000000000000000007807191E17
:031E1600000002C7
:1007ED00AFD380D3843ED7D3C23E01D3C23E0021C6
:1007FD00E806CD0000C9ED73211E310000E52A2D5C
:10080D001E180BED73211E310000E52A2F1EF5D5A4
:10081D00C5ED4B231ECD8E057832241EC1D1F1E1DD
:10082D00ED7B211EFBED4DCB78CBF8C0212C1E3678
:10083D00043A1E1EB72013CBB821191ECB4EC8CBC0
:10084D008E3E00218707CD0000C9211D1E342335A2
:10085D002A1B1E4E23221B1E3A2B1E210000C3866F
:10086D000521000079CDDC05180F21191ECB46C2DC
:10087D00250921000079CDD305212C1E3520051623
:10088D0050CD240B3E51D3C1CB50C27A093A251E0F
:10089D00B7C24E0BCB702894CBB0CBB83E0021F72E
:1008AD0006CD0000C93E00322B1E18CD3E00322B66
:1008BD001E21291E7118C2AF322B1E3A291ED630A9
:1008CD00381AFE0930168757878782577906303800
:1008DD000BFE0A3007822804FE51382BCD17093A3A
:1008ED00291E4FC36E083E0018023E00322B1E1803
:1008FD0088AF322B1E3A261E1804AF322B1E81CA2A
:10090D008608FE51D28608C33F0A2A1B1E2B221BC6
:10091D001E211D1E352334C921291E7116AACD2471
:10092D000B3E5121261EBE28382100003A291ECD2E
:10093D00C705DA86085FAF57676B292919110000C3
:10094D001911231E1AF620D380127ED3B0237ED325
:10095D00A8237ED3A4237ED3A2237ED3A1CBE818D4
:10096D0025CD170921251E343E01C33F0A3A261E07
:10097D003DCA8608CBA818093A261EFE5130E2CB97
:10098D00E816AACD240B16C8CD240B21261ECB6844
:10099D002803341801353A231EE6DFF618CDFD0A7B
:1009AD001614CD240B79E6CFD38032231E3ED1D33E
:1009BD000C221CB09222F1E1678CD240B1835DBC191
:1009CD0032371E79E6D7F610CD0C0B3E51D3C2037C
:1009DD000C12A311ECD8E051614CD240B79E6CFF626
:1009ED0008D38032231E1614CD240B79E6CFD0A16A3
:1009FD00701830CB50200ACBD021251E360123365E
:100A0D00543E51D3C23A261EFE5130E3CB902126DF
:100A1D001E360179F608E6CCD38032231E3E51D323
:100A2D00C216C8CD240B21231E7EE6C7D38077C303
:100A3D00910B5F21261E96CA860B73CBE83004ED17
:100A4D0044CBA8FE01CAA30932291E2A331ECD8E1E
:100A5D00051101 1EFE14300721DF0ACD8F05572128
:100A6D002A1E7EF6C0D384773A231EE6CFF608CD34
:100A7D000FD0ACBBB1DED53271E3ED1D3C221A40AC7
:100A8D00222F1ECD240B21271E7EB72011CBFE1643
:100A9D00A0CD240BC3040A21271E34CB7EC83A29CE
:100AAD001E3D28273291E5E2356FE0B30BA3D20EF
:100ABD000A212A1E7EE60FD38477AF21F30A856FB4
:100ACD007CCE00677EBA38A057189D2A351ECD8E74
:100ADD0005C32A0AB17 6B5948453C3835322F2E54
:100AED002D2926242220FF61352A27252322211F87
:100AFD006FE603CB68280F3CFE032010AF180D6F77
:100B0D00E603CB6828F13DF2190B3E02673EFCA5CA
:100B1D00B4D38032231EC9E12220D1E3EC7D3C17A24
:030B2D00D3C1C968
```

Fig. 3d

```
:101E1900000000000000000000000C000010000F8
:101E29000100000434085608560856085603000F0
:100B300021251E34CB482816341813F32A241E24EA
:100B4000CB4D280124CB7DCBFDFB22241EC0217779
:100B50000B180C2322391E1678CD240B2A391E11AE
:100B60002A1EF31AE60FB6D384FB123E7BBD20E3A8
:100B700021251E35C391088040804000E0B1802CD
:100B80000E03213B1E7E817721231E7EF604D38037
:100B900077C3860835C021231EF37EE6FBD380771A
:020BA000FBC98F
:031E3900770B0024
:100BA200FD213C1ECD0000FD6605FD6E04E5DDE184
:100BB200DD360500DDCB06AEDD7E04FE2D28143ABF
:100BC200751EB7280EDD7E02FE002807DDCB06EE7D
:100BD200C3A30CDD7E0421EC0BCD0000FE06D2E5A2
:100BE2000BEBE9DD360500C3A30CF20B2D0C3C0C1C
:100BF200FD21631EDDCB064E202BFDCB0DC63E2014
:100C0200DDCB0656280EDDCB065ECC8B06DDCB0691
:100C12005EC48306DDCB0646CAA30CFD21631ECD4E
:100C22000506C3A30CFDCB0D8618D3DD7E02FE00A4
:100C3200C2A30CAF32751EC3A30CFD21631EDDE5FA
:100C4200E1FD7508FD7409FD7E04FDBE062030FD40
:100C52007E05FDBE072028FD214E1ECD0000F3DDDE
:100C62007E04DDBE06200EDD7E05DDBE072006DD2C
:100C7200CB0DF6FBC9FB3E0021810CCD0000C9FD66
:100C820021631ECD4B06FD6609FD6E08AFFD770997
:100C9200FD7708E5DDE1DD6609DD6E0870DD360A07
:100CA2001FD21561ECD0000DDCB066E2804DD3687
:100CB20005000DDCB06AECD1901C3A20BFD21631EDB
:100CC200FD6E08FD6609E5DDE1DD360500AFFD7765
:100CD20003FD7709FDCB0DB618C73DC03E000E00DA
:100CE200CD0A0DDD21631EDD6609DD6E087CB5C807
:100CF200E5DDE1DDCB06EEDD21631EDDCB0DB63E8B
:100D02000021BE0CCD0000C9FDE5FD21421EFD778C
:100D120002FD21421ECD00003E00FDBE012836FD2F
:100D22006605FD6E04E5FDE1FDCB06BEFD36050060
:100D3200FDCB067620DBF D7E07FD21481EFD7405F6
:100D4200FD7505FD7702FD21481ECD0000E5FDE1A0
:080D5200FD710218BCFDE1C9AE
:101E3C0000000000FF0000000000000000000097
:0D1E4C0000000000000600C631E0000029A
:100D5A00DB883EFFCD8B063E0021A20BCD0000C9E9
:100D6A00ED736D1E310000E5F521000034D5C5DBB9
:100D7A0088FB21701ECB46284ADB844723AE7028A5
:100D8A00FE608280BCB58233A3E20CD7B061833AD
:100D9A002BCBFE0E88110100AFED59ED59E3E3DBD1
:100DAA0088EEC0F2B70DAAF2BC0D5718F2CB133079
:100DBA00E87A2BF35EED5923CBBEFB4ECDD30D2142
:100DCA00701E712A6D1EC3000021721E87380336F9
:100DDA00FFC97AE63FBE2806CBA1CBA977C92A610B
:100DEA001ECDD3057AE63F11083DCD6A0EC0380400
:100DFA002B7E1852CB402808210000CDBF05183998
:100E0A00CB68280521000182DCB48216F1E280C1D
:100E1A00CB6E210000281F210000181ACB6E23056E
:100E2A0021000181121000CD8F05D8210000CB28
:100E3A0060C4C7051804CD8F05D832731E2100007F
:100E4A00CDC705D4830E47FDE5FD21631ECD1A06E0
:100E5A00FDE1CB71C83E0021810CCD0000CBB1C9A8
:100E6A0021741ECB69280FCB61280435C0180435BC
:100E7A00C0CBE173BFC9CB61C0CBE17237C9CBE943
:030E8A00CBA1C930
:101E61000000591E611E591E591E0000FFFF00008F
```

Fig. 3e

```
:051E710000FFFF00006E
:100E8D00110418CD6A0EC0301421241ECB40280841
:100E9D003E02F3AE77FB1803CD380ECB86C33B0B1A
:100EAD00CD6A0EC021751E7EB7C03E0021C41DCD7A
:100EBD000000D821751E34C9CB68CAEE0D111C1C5B
:100ECD00CD6A0EC0DC880EC30000FD21761ECD005C
:100EDD000021FD0E06060E00CD6E00C39F10DD36FF
:100EED000050018F7DD36050018F1DD36050018EBA5
:100EFD00090F140F170F170FD40FD40F2A871EDDEC
:100F0D007508DD74091800C39F10DD560DDD5E0CEC
:100F1D00D52A871EB7ED52E138C4117C02CD3F05AD
:100F2D00E521000079CD8F05E138B3FD21091FFDC5
:100F3D00CB00AEFDCB00A6FDCB0096FDCB009EDD1C
:100F4D007E04FE022804FDCB00E611A40019E51174
:100F5D008002B7ED52D13001EBDD560BDD5E03188B
:100F6D0000FD21091FFD7101FD740BFD750AFD3694
:100F7D0000F00FD3604007AB7CA9F10FDCB0086FD29
:100F8D00CB008EDD7E06E603FDB600FD7700DDE5C8
:100F9D00E1FD7506FD7407DD6609DD6E08FD740360
:100FAD00FD7502DD360A00FD730EFD7205FD217C17
:100FBD001ECD0000FD21091FFDCB00F6FD360F00F3
:100FCD00DD360500C39F10FD21091FDD560DDD5EC9
:100FDD00C2600DD6E0B2D19D5118102B7ED52D106
:100FED00D2EB0E2600DD6E0BD5111300DDCB0646C0
:100FFD002803111100FDCB00EEFDCB0096DDCB06D5
:10100D000562807FDCB00D61114000CD0B057CB7D1AA
:10101D00C2EB0ED5EB531E00D5DD4E037921B81072
:10102D00CD00001AFE01D1E1CAF10EFE03CAF70E82
:10103D00DDCB065E2022FDCB009EDDCB06562005C6
:10104D00FE02CAF10EFDCB00A6DD7E04FE04CA6EC3
:10105D0000FFDCB00E6C36E0FFDCB00DEDD7E0EFD7A
:10106D00770CDD7E0FFD770018DBFD21091FFD7E51
:10107D0004DD770AFD7E0FDD7705DDCB06A6B720F3
:10108D0011FDCB0066200B3A251FFE032804DDCB96
:10109D0006E6FD21841ECD0000FD21091FFD36074A
:1010AD0000FD360600CD1901C3D70E891E991EA964
:0B10BD001EB91EC91ED91EE91EF91E37
:101E7600000000FF00000000C8007211091F0000EA
:041E86000200000254
:011E99000246
:011EA9000236
:011EB9000226
:011EC9000216
:011ED9000206
:011EE90002F6
:011EF90002E6
:1010C8003A231EF64032231ED3803E81D3D83E02F7
:1010D800D3D93E14D3DC3E40D3D216007ACD3E118C
:1010E8003E01D3D2CDDA14382F3E03D3D03E00D3FD
:1010F800D13E02D3D2CDDA14381E01D3143EFFEDOF
:10110800058A310FB3C20097A21B810CD9A05360166
:10111800147AFE0120C6180EAF21B810CD9A0536F4
:10112800033CFE0120F3CD44113E00D3CC3E002108
:10113800D70ECD0000C9E607F6081801AF4F212ADF
:101148001EF37EE6F0B1D38477C93A091FCB6FC08E
:101158000211F1FAEE62DC0ED5B131F2A211FB7ED1F
:1011680052C03A1E1F21201FBEC9DDCB007EC02100
:101178000A411F3DBDEFEC0200B22191F3E87D3CF5C
:10118800 3E01D3CFFBC9ED73111F310000E5F521F6
:1011980000034FBD5C5DDE52A191FE93A0E1FB753
:1011A800204B21091FCBBECB7620083E00217710AB
:1011B800CD000021D11122191FDBDEFEC020283E00
```

Fig. 3f

```
:101C8000BD3CFCD4411FB181E3E03D3CFDBDEFE7D
:1011D800C0280A3E87D3CF3E64D3CF180ACD441126
:1011E800FB3A0E1FB720062A111FC3000021091F52
:1011F800CBFECD521128083A1D1FE601C40113ED9C
:101208005B131F21091FCB6E28123A0A1F321E1FBB
:10121800218002AFED523035575F1831217F02AF80
:10122800ED523004575F180F21A000B7ED52200788
:101238001 1A400210A1F343A0A1F210000CD8F058E
:10124800321E1F30083E0032181FC3AA11ED531377
:101258001F3A091FCB5728043E14181B0613CB4707
:10126800230206117832231F3A171F4F3A0E1F81A2
:101278003803B83801789132241F3A091FCB672800
:1012880023A241F21231F963006CD5211C4331344
:10129800CDED12EBEDB032171F211D1FCBC63A1F43
:1012A8001FE6222813CDD412CD01131B0BCD5211ED
:1012B800C43313CDED12EDB021131F34110D1F21CE
:1012C8001A8612131A9612C3A4113A091F3240
:1012D8001F1F3A1E1F32201F2A131F22211F2A15E3
:1012E8001F221B1FC9ED5B0B1F212A1FAFED4B17D8
:1012F8001F4709ED4B241F47C9E122261FCD83133C
:101308002000CB41CCBB14CD111477CD241401D4BF
:1013180014212A1FEDB3CDAD133E04D3D2CDE01373
:10132800CDEF1321FFFF22211F184CE122261FCDEC
:10133800D4123E0332251F18072A0000232200007A
:10134800CDAD133E02D3D2CDE013CDEF13212A1F2A
:101358001D314EDB2CD8813381DCD6114CD11140D
:10136800BE280C21251F35C241133E003218 1F3AF2
:101378001F1FCB47CC9C14211D1FCB862A261FE993
:10138800211F1F4ECB69280ECB5137C0CB592806D9
:10139800DD2A1B1FAFC93A201F21B810CD9A05239B
:1013A800E5DDE1AFC9E122281FDBDEFEC02B102100
:1013B800C01322191FC3EF11DBDEFEC0C2DB113ED2
:1013C80040D3D23A201FCD3E11FB3A211FD3D03A49
:1013D800221FD3D12A281FE9E13ED7D3CF3E01D31C
:1013E800CF22191FC3EF11ED5B211F21F205B7EDC5
:1013F8005254502929192929293EA7D3CF7CD3CF57
:091408003EA5D3CF3E01D3CFC9AC
:101F09000000000000000000000000000000000C8
:101F1900EF110000000000FFFF0000000000000BA
:101F290000000000000000000000000000000000A8
:051F3900000000000000A3
:1014110021A1F0611AF862310FCC9804020100825
:101421000040201210000223C1F060D118000D51687
:101431 0000DD7E00DD234FE6075F211C1419594EA4
:10144100CB3BCB3BCB3B212A1F197EA1D1280A7E66
:10145100A9772A3C1F19223C1FCB3BCB1A10CFC9BD
:10146100110008 2A3C1F7CA220027DA3D5F516009D
:10147100DD7E0C4FE6075F211C1419594ECB3BCB37
:101481003BCB3B212A1F19D1792FA6CB732001B163
:1014910077D1DD2BCB22CB1330C9C9212A1F0608F6
:1014A100CB3E1F2310FAE67F4F0608CB3E1F2310C9
:1014B100FAE67FCB3E23772371C9213C1F4E2B7E59
:1014C1002BCB26E67F06082B87CB1610FA79E67F11
:1014D10006082B87CB1610FAC92115042B7CB537CA
:1014E100C3DBDEFEC020F5C9FD3604041804FD3654
:1014F1000405FDE5FD360600FD7703FD7409FD7564
:101501000 08FD360B01FD700DFD710CFDE5E1FD7E61
:101511000 07FD213E1FFD360000FD360200FD74056A
:10152100FD7504FD213E1FCD0000FD213E1FFD364E
:1015310000000FD360300FD7702FD213E1FCD0000B6
:07154100FDE1FD7E05B7C9C5
:061F3E00000000000000009D
```

Fig. 3g

```
:10154800E5FDE5D121B815010000EDB0E106001672
:10155800007EE6075FE5211C14197E2F4FE15ECB64
:101568003BCB3BCB3B7BFE01D0FDE5FD19FD7E006F
:10157800A1FD7700FDE1230520D5C9FDE5E5AF4EC6
:10158800230608CB213805FD7700FD233CFE012802
:10159800050528EB18EDE1E1010000CD5900FD75C6
:1015A80000FD7401C921B810CD0000EB7EFE00C912
:1015B800FFFFFFFFFFFFFFFFFFFFFFFFFFFFFFFF33
:1015C800FFFFFF83E0021D515CD0000C9FD2144DD
:1015D8001FCD000021E91506050E00CD6E00C3D809
:1015E80017E217E217F315E217BB1721701F4623FE
:1015F800DD5609DD5E08CDE905380CE5C5CD3D169B
:10160800C1E130ECC3DE17E5DD5609DD5E08CD3DEE
:1016180016E1DADE177E23666FB428164623DD56F8
:101628009DD5E08CDE9053809EB1680CD7B16DAB1
:1016380DE17C3E217CD7E17D8CB77200BDDCB069C
:101648046C0DDCB06C6182B2323CB6F2806DDCB7F
:10165800C6181FDDCB06462019DD5E03D5E5DD7D
:101668005609DD5E08CD7E173803CD7B16E1D1D84B
:10167800DD7303CDE81721FCFF39F9010400CD2003
:1016880018C1E178B12824CDB317110000DDCB03D0
:1016980056202FDDCB03662043CD2018214A1F0194
:1016A8000100CD2018AFBA28CD37C921FEFF39F97E
:1016B800010200CD2018E1CDB317DD750ADD740BEA
:1016C800B7C9CD4B1738D5FEFE200ACD4B1738CCFD
:1016D800B720063EFE772318E9856F7CCE00671891
:1016E800E1CD4B1738B6DD770ACD071738AECD07F1
:1016F8001738A9CD071738A4CD0717389F18E2DD8A
:10170800CB0A26380FDDCB0A26302DCD4B17D8DD76
:1017180086C0C1828CD4B17D8DD860CF5CD4B17E372
:10172800381ECB1DCE006F7CE3DDCB0A2630027756
:101738002338F1337723B7C9CD4B17D87723B7C9E4
:101748003333C9AFBB202778B137C8E560690114C6
:1017580000AFED42300709444D676F1803011400CC
:10176800E5214A1F59CD2018C1E1FD214A1F1DFD61
:101778007E00FD23B7C9D57AFE103F382C21601FA3
:10178800CD8F05BB38233728204A06006960290910
:101798001080009CDE81721FCFF39F923010300EE
:1017A800CD2018F1E1DD7703B7D1C9DD5E0CDD5638
:1017B80019C9DD5603DD6609DD6E08CDE817DDB4
:1017C800660DDD6E0CDD460BDD4E0ACD2018180ABD
:1017D800DD3605821804DD360500CD1901C3D5159F
:061F4400000000FF000098
:1017E8007ACB7F2804225E1FC9010000ED435E1FEB
:1017F8001FCB181FCB1809894F110F2006037DA393
:10180800B2D38C7D1F1F1F1FA3D38C05C8B2D38CE6
:101818006C61AFD38CC30618D5ED5B5E1F7AB32815
:10182800FEBAF86EDA0EA2B18225E1FD18257C9B5
:10183800D13EFFCD60183E0A3DF24018CD60183504
:1018480034DB8CCD6018ED67DB8CED677E82572327
:10185800B78B13E0120E1C9E61FD38CE60FD38C8B
:01186800C9B6
:021F5E00000081
:10186900310000FD21601F1600D5210000FD750023
:10187900CDE81721FEFF39F9010200CD2018D11456
:101889002803FD7300FD23D1147AFE1038DBFD21F6
:10189900601FDD21711F110000AFFDBE00283CCD86
:1018A9007A19D51E00CB76232827E37DFE1028332D
:1018B9002CE3DD7302DD7203D5E57E23666FCDE837
:1018C90017DDE5E1010200CD2018010400DD09E181
:1018D900D123231C7BFDBE0038CBD1FD23147AFE16
:1018E9001038B631000021701F73AFDD7700DD7746
```

Fig. 3h

```
:1018F900013A01203C2808DD360008DD360120DDEB
:101909002100000DD360000DD360100FD21601F16D3
:1019190000AFFDBE00284CCD7A19D51E00D5E5CB08
:101929007E28347EDD7703235E2356DD7209DD735D
:1019390008DD360600D5CD3D16D1E138FEE5CB5E92
:101949002815DD6E00DD6601DD5E0ADD560B7323A9
:1019590072DD7300DD7201E1D12323231C7BFDBEFF
:101969000038BAFD2314FE1038A73E03D38SC300FC
:101979000D5210800CDE817FD6E002600545D2929
:1019890019444D210000CD2018210000D1C9FD21A5
:101999900B31FCD000021BF1F060E0E00CD6E00182B
:1019A90028219F19DD7E04CD0000EBE900000002D
:1019B900000021000013032100000E5CD0000E5FD2D
:1019C900E1E12801E9DD360500CD190118C03E0025
:0719D900219719CD0000C9A0
:101FB300000000FF0000000000000000081BE01933
:101FC300E019E019E019E019C019821B821B821B7A
:081FD300BB19AA19AA19AA19E9
:1019E000CD00000CACE19DD4603DD4E02CD00002831
:1019F0000EE5FDE1DD7E0421101ACD0000EBE93E8D
:101A000000180A3E0018063E0018023E00DD770569
:101A100018520318101A671AC41A121BDDCB064688
:101A20028103EFFFDE5CD291BFDE12803C3071A61
:101A3000180FDD7E04FDE5CD291BFDE12803C3075A
:101A40001A3E00DD4603DD4E02DDE5E11106001918
:101A5000CD0000B72806DD7705C3D219DD340C3080
:101A600003DD340C3D219DD7E04FDE5CD291BFD58
:101A7000E12803C3071ACD0000DD660DDD6E0CFD05
:101A80005600DFD5E0CB7ED52F53E00DD4603DD4E12
:101A900002DDE5E111060019CD0000C1B72805DD22
:101AA000770518C0DD340C3003DD340DDDCB064680
:101AB0002882C5F138AEDD4603DD4E02CD00000CAC6
:101AC0000001A18A0DD7E04FDE5CD291BFDE12803DE
:101AD000C3071ACD0000DD5609DD5E08D5FD660B93
:101AE000FD6E0AB7ED52E13000FD750CFD740DDDA1
:101AF000CB0646281ADD4603DD4E02CD0000CA0B98
:101B00001A180CDD4603DD4E02CD0000CA0B1AC3C5
:101B1000641ADD4602CD0000CA0F1BE5FDE1FD465B
:101B20005FD4E06CD000018E9FD4E04CD0000FD78
:101B3000660FFD6E0F110000180 9FD4E00FD6609CD
:101B4000FD6E08E5D558FE00280EFEFF20041E207D
:101B500018062178 1BCD000079E678A3E1D128147E
:101B60007CB52812D5010400CD5900D17DBB2006DB
:101B70007CBA2002AFC9F601C9004010100000086D
:101B800087806 00CD0000CACE19E5DD5609DD5EF5
:101B900008CD961CFDE12024FDE5430E00CD00009C
:101BA000FDE1201C21941BDD7E04060ACD2F01E9F6
:101BB00000000000000000000000000003E00180EC1
:101BC0003E00180A3E0018063E0018023E00DD776F
:101BD00005C3D2193E0018F6CD0000CACE19DD5655
:101BE0009DD5E08CD961C20D343CD000020E5DD45
:101BF000CB064E28070E00CD000020D80E00C5DD14
:101C0000CB066E200FED5F4740DD4E02CD00002079
:101C1000F4D1180CDD4603DD4E02CD0000D120A426
:101C2000DD7003DD4E02FD210000DD7E06E61CCBEB
:101C300027CB27C5D547DD560BDD5E0AF5C521004C
:101C400000001060009E5FDE1C1DD7E04CD3A1BE19E
:101C5000D1C1C2CC1BCBFCDDCB064E2802CBBC7C59
:101C60002FD5CD0000C1CAC81BCD0000E5FDE1FDA8
:101C700005606FD5E07DD7208DD7309FD5E0AFD563E
:101C80000BFD660DFD6E0CDD730ADD720BDD750C50
:101C9000DD740DC3D219D50E000600C5C10CC5797F
```

Fig. 3i

```
:101CA000400E0021000022000021000032000003E12
:101CB00000CD0000FE002811210000C1D1D5C506CD
:101CC0000648CD2E0020D51302F601C1C13A000009
:101CD0005FC93E01CD8306FD21ED1F210000600F6
:101CE000CD0000CD831DDD2105202115200D7500EF
:101CF000DD7401DD360300CD2703CDAF1DDD2105E9
:101D000020DD7E03B72866FD21ED1F21000000600BF
:101D1000CD0000FD21F91FFD770B211520FD750871
:101D2000FD7409FD21E11F21F91FFD7405FD7504F6
:101D3000FD360200FD21E11FCD0000FD21E71FCD92
:101D40000000FD6605FD6E04E5FDE1FD7E05FE007B
:101D50000281BB7FD21ED1F230CCDFC043EFF3200EF
:101D6000FD21ED1F21000000600CD0000FD21DB5C
:101D70001FCD00003E01CD8B06FD21DF1FCD0000F1
:101D8000C3D21CFD21ED1FFD360400FD360601FD0A
:101D900021E11F21ED1FFD7405FD7504FD3602000D4
:101DA000FD21E11FCD0000FD21E71FCD0000C9FD91
:0D1DB00021ED1FFD360401FD360601BD29E
:101FDB0000000000000000000000000000000FFF7
:101FEB000000000000000000000000000000000E6
:101FFB0000000040000001520000015200000004F19
:0A200B000000000000000000ED1FBF
:101DBD00FD217020CD00003E00FD216D20FD77023C
:101DCD00FD216D20CD00003E00FD216D20FD77022F
:101DDD00FD216D20CD00000FD216520CD0000FD7E93
:0D1DED0001B723CCFD216920CD00001BEAC7
:0D206500000000000000030000000000006B
:00000001FF
```

MICROCOMPUTER HAVING ROM MASS MEMORY FOR DOWNLOADING MAIN RAM MEMORY WITH MICROCOMPUTER INSTRUCTIONS

BACKGROUND OF THE INVENTION

1. Field of the Invention

This invention relates to microcomputers and in particular to virtual memory arrangements for microcomputers.

2. Description of the Prior Art

In the early days of digital computers, very slow main memories were used for storing data and instructions for the computer. These memories took the form of magnetic drums, magnetic tapes and mercury delay lines. Later, magnetic switch core memories were commonly used. As the size of programs increased, magnetic drums, magnetic tapes and magnetic discs were used to store the programs for subsequent calling in to the main core memory.

Miniaturization of computer architecture included memory miniaturization resulting in integrated circuit random access main memories. In many cases these were replaced by read-only memories in which were stored the instructions for the microcomputer. As the microcomputer systems grew larger and program memories were required to grow larger, the larger ROM became expensive and contained much of the program that was not needed at the moment.

This virtual architecture uses a RAM and a low cost, large read-only mass memory for the mass storage of instructions. The instructions from the mass memory can be downloaded and overlayed onto a portion of the RAM space not immediately required for program execution.

BRIEF SUMMARY OF THE INVENTION

A microcomputer system is extremely versatile and useful in data processing apparatus such as input and output terminals. A microprocessor system controls the operation of the data processing apparatus in accordance with a list of instructions received. These instructions come from a main memory which has a random access memory (RAM) for storing a portion of this list of instructions. In this preferred embodiment, the main memory also has read-only memory containing start-up instructions to enable the microprocessor system to begin operation. The RAM must also have storage available for data and constants required in computations.

A large scale read-only mass memory has the entire instruction list for the microprocessor system permanently stored therein. As the instructions from the RAM are used and the sequence is no longer necessary, new instruction sequences are brought in from the mass memory to the RAM for ultimate execution by the microprocessor system. A controller is employed to address the mass memory for transferring instructions to the RAM and further has means for addressing the RAM to affect transfers between the RAM and the microprocessor system.

As the microcomputer system requires additional program functions, these functions are continuously downloaded from the mass memory and overlayed onto a portion of the RAM storage space not required for immediate program execution. The overlay process continues as long as new program functions are required.

The principal object of this invention is to provide the microprocessor system of a microcomputer system with executable instructions at a high access rate.

Another object is to provide the microprocessor system of a microcomputer system with instructions through a directly accessed memory whose capacity is less than the list of instructions.

Still another object of this invention is to provide the microprocessor system of a microcomputer system with a random access memory for direct access by the microprocessor system and a read-only memory for bulk storage of an instruction list.

BRIEF DESCRIPTION OF THE DRAWINGS

FIG. 2b is a schematic diagram of the circuitry for controlling the accessing of the random access memory.

FIGS. 3a–3i form a map, in hexidecimal code, of the contents of the read-only mass memory.

DETAILED DESCRIPTION OF THE INVENTION

The invention described herein is of a virtual memory microcomputer architecture for controlling a microcomputer which in turn is useful in controlling data processing apparatus. A random access memory (RAM) is directly accessed by a microprocessor system which uses instructions and data from the RAM for carrying out a program. The RAM does not have sufficient capacity for storing all of the instructions in the program. Instead, a read-only mass memory has all of the instructions permanently set therein, those instructions being readable into the RAM to overlay portions of the RAM as the instructions are used in the program and no longer required in the program routine. This overlaying technique is continued until the program is completed. The following preferred embodiment illustrates the invention.

Figure 1A:
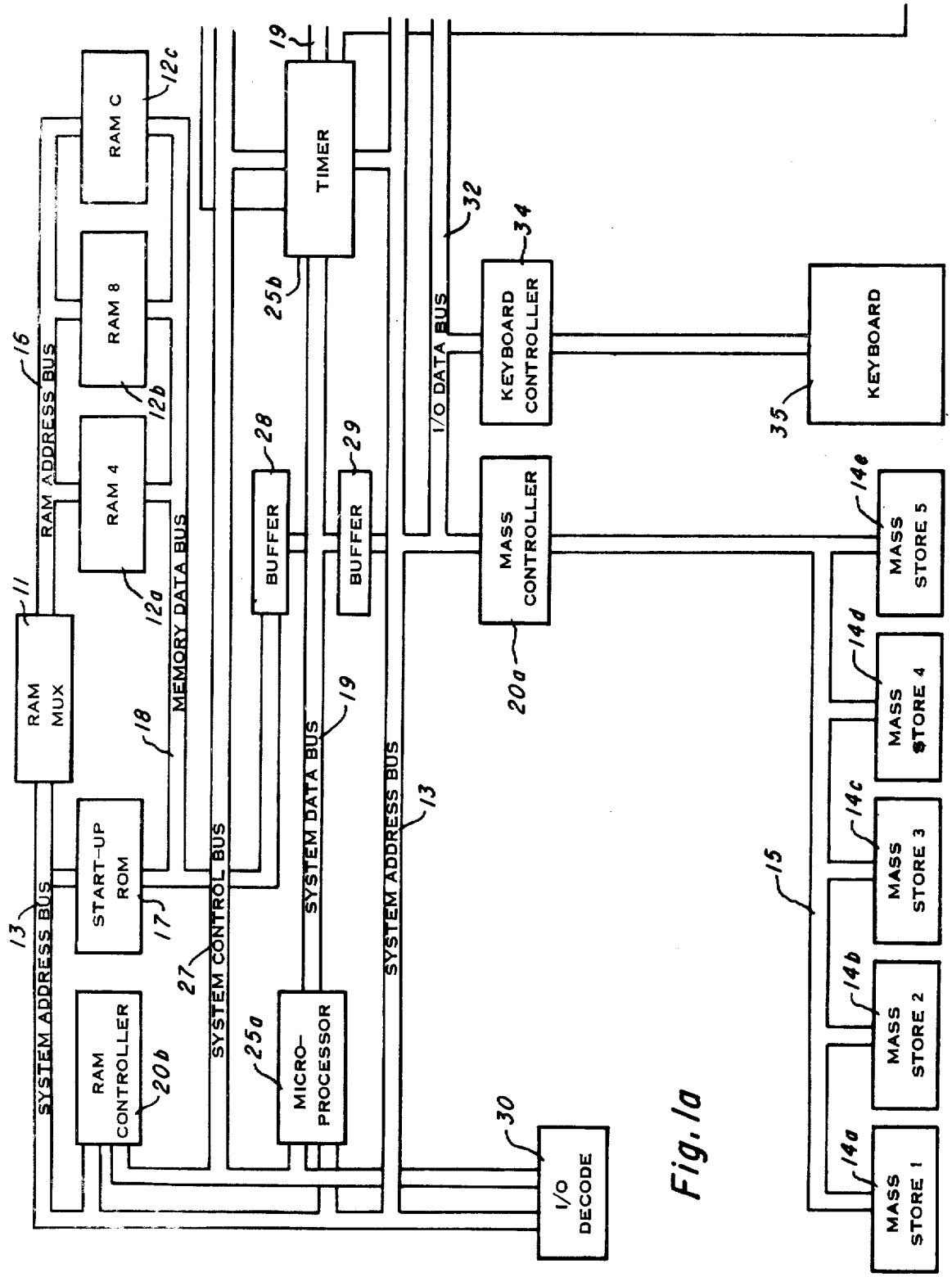
FIGS. 1a and 1b form a block diagram of an electronic terminal employing the virtual memory microcomputer architecture.
Figure 1B:
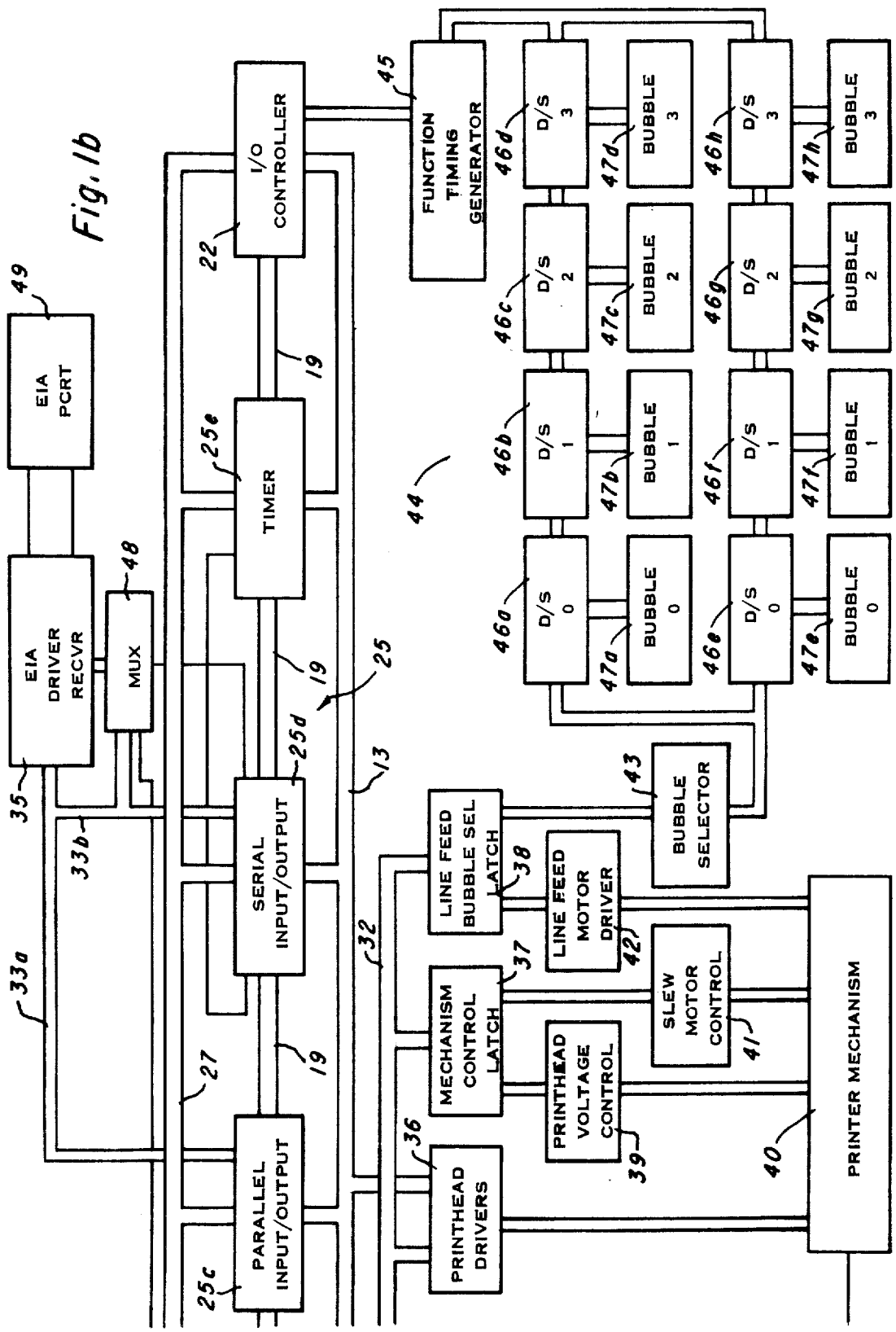

Referring now to FIG. 1, a block diagram of an electronic input/output terminal employing the invention is shown. Microprocessor 25a, timer 25b, parallel input-/output unit 25c, serial input/output unit 25d and timer 25e form the total microprocessor system of this invention. The particular microprocessor system selected for implementing this invention is the Zilog Company Z80A made up of components 25a through 25e, all described in "Zilog Microcomputer Components Data Book" dated February, 1980. System control bus 27 extends from microprocessor 25a to timer 25b, to parallel input/output unit 25c, to serial input/output unit 25d, to timer 25e and to IO controller 22. System address bus 13 extends from microprocessor 25a to timer 25b, to parallel input/output unit 25c, to serial input/output unit 25d, to timer 25e and to IO controller 22. IO controller 12 is a Texas Instruments Incorporated type TMS5501 and is used for communication with function timing generator 45 for use with bubble memory 44. Bubble memory 44 is comprised of units 47a–47h controlled by drive sense modules 46a–46h. The bubble memory is peripheral to this invention and need not be described in detail here.

The system data bus 19 from microprocessor 25a is serially connected to microprocessor units 25b–25e, terminating in IO controller 22. Buffers 28 and 29 are connected to system data bus 19 and are Texas Instruments type SN74LS 245 octal bus transceivers described in detail beginning at page 7-349 of "TTL Data Book for Design Engineers" Texas Instruments Incorporated, copyrighted 1976. Buffer 28 interconnects memory data bus 18 with system data bus 19. Buffer 29 interconnects I/O data bus 32 with system data bus 19. I/O data bus 32 is connected to keyboard controller 34, printhead drivers 36, mechanism control latch 37 and line feed bubble select latch 38. Latch 38 has an output connected to the input of bubble selector 43 which in turn is connected to the bubble memory 44. An output from latch 38 provides an input to line feed motor driver 42 which is part of a printer having an output to the printer mechanism 40. Printhead drivers 36 also are connected to printer mechanism 40. Latch 37 has one output connected to printhead voltage control 39 which in turn has an output connected to the printer mechanism 40. Latch 37 also has an output to slew motor control 41 whose output is connected to the printer mechanism 40. The printer mechanism is well known and need not be described in detail.

Keyboard controller 34 is connected to keyboard 35. The keyboard 35 and keyboard controller 34 are well known and need not be described in detail.

I/O decode 30 is made up of a programmable logic array and a decoder. The combination of these two components provides output signals in response to command and address input signals from microprocessor 25a.

EIA port 49 is connected to EIA driver-receiver 35 which in turn is connected through bus 33a to parallel input/output unit 25c and through bus 33b to serial input/output unit 25d. A baud rate source multiplexer 48 is connected to unit 35 and also to unit 25d to provide synchronization. The EIA port 49 and associated hardware described is for communication involving 24 volt levels. This is old in the art and need not be described in detail here.

Mass controller 20a is connected to buffer 29 through I/O data bus 32. Mass store 1 through mass store 5 (14a–14e) form the read-only mass memory 14 and are connected by bus 15 to mass controller 20a.

RAM controller 20b is connected to I/O decode 30 and microprocessor system 25 by way of system control bus 27. RAM controller 20b is also connected by way of the system address bus 13 to microprocessor 25a and I/O decode 30. Start-up ROM 17 is connected to memory data bus 18 and to system address bus 13. Its permanently stored instructions form a boot strap program to enable the microprocessor 25a to utilize preliminary instructions. In this preferred embodiment, a Texas Instruments Incorporated type TMS4764 read-only memory is employed.

RAM multiplexer 11 receives its inputs from system address bus 13 and addresses RAM 12 which is connected by RAM address bus 16 to RAM mux 11. Memory data bus 18 is connected to RAM 12 as well. RAMs 12a–12c, in this preferred embodiment, are Texas Instruments type TMS4116 described in detail beginning at page 101 of the "The MOS Memory Data Book for Design Engineers" of Texas Instruments, copyright 1977. RAM multiplexer 11 is a Texas Instruments type SN74SL257 quadruple Data Selector/Multiplexer described beginning at Page 7-372 of the "TTL Data Book".

The read-only mass memory 14a–14e, in this preferred embodiment is made up of five Texas Instruments TMS6100 read-only memories fully described in the Texas Instruments publication "TMS6100 Voice Synthesis Memory Data Manual", dated June, 1980. Presently, as many as 16 such units could be used. Each of the mass stores 14a–14e have a capacity of sixteen thousand three hundred eighty four bytes. When so ordered, the contents of any of the mass stores 14a–14e is transferred by way of bus 15 through I/O data bus 32 and buffer 29 to microprocessor 25a. According to this invention, no processing is done at this time, the information being simply assembled into bytes and then transferred via buffer 28 to the RAM 12 via memory data bus 18. Subsequently, the instructions are read into microprocessor system 25, from the RAM 12 for execution of instructions.

Figure 2A:
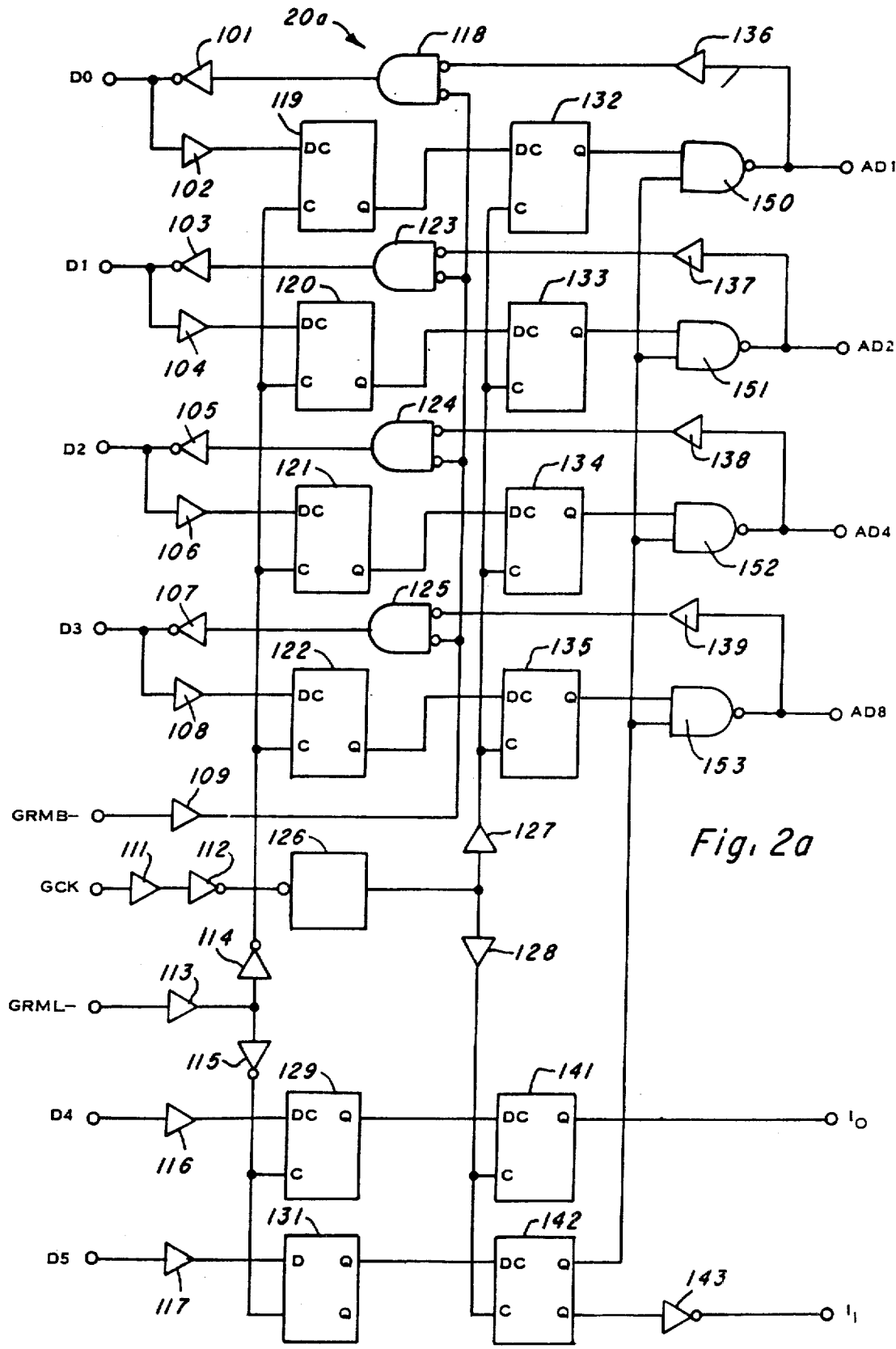
FIG. 2a is a schematic diagram of the circuitry used in accessing the read-only mass memory.

Referring now to FIG. 2a, mass controller 20a is illustrated schematically. Data bus lines D0–D3 are connected through amplifiers 102, 104, 106 and 108 respectively to the inputs of "fall-through" flip flops 119–122, respectively. Data bus line D4 is connected through amplifier 116 to the DC input of "fall-through" flip flop 129. Finally, data bus line D5 is connected through amplifier 117 to the D input of D type flip flop 131. "Fall-through" flip flops 119–122 and 129, and D type flip flop 131 from a data latch. A common clock signal "GRML-", from I/O decode 30, is applied through amplifier 113 and inverter 114 as the clock inputs of flip flops 119–122 and through inverter 115 to the clock inputs of flip flops 129 and 131. Flip flop 131 is a D type flip flop to ensure that a transfer to subsequent sync latch flip flops does not occur until all of the data is stable.

"Fall-through" flip flops 132 through 135 have their DC inputs provided by the Q- outputs from "fall-through" flip flops 119 through 122 respectively. "Fall-through" flip flop 141 has its DC input provided by the Q output of flip flop 129. Flip flop 142 has its DC input provided by the Q output from flip flop 131. These six last mentioned flip flops form a sync latch. The clock signal GCK at 200KHZ from a clock (not shown) is applied through amplifier 111 and inverted through amplifier 112, then applied to one-shot multivibrator 126 whose output is amplified through inverter 127 and provides the clock inputs to flip flops 132 through 135. The output of one-shot multivibrator 126 is also amplified by amplifier 128 and provides the clock inputs to flip flops 141 and 142. These six flip flops, together with one-shot multivibrator 126 synchronize input signals to the mass memory clock.

NAND gates 150–153 each have one input provided from the Q output of each of flip flops 132–135 respectively. The other input to each of NAND gates 150–153 is provided by the Q output of flip flop 142, such output identified as signal Ii. The outputs from NAND gates 150–153 are applied to terminals AD1, AD2, AD4 and AD8 respectively, the mass memory bus. The Q outputs from flip flop 141 is applied to terminal Io and the Q- terminal of flip flop 142 is inverted through inverter 143 and is applied to terminal Ii. NAND gates 150–153 form a mass memory output buffer which places information onto the mass memory bus when the synchronized Ii signal goes high. A mass memory bus lines are low only when Ii is high and the corresponding data bit is low.

The signals on mass memory lines AD1, AD2, AD4 and AD8 are amplified through amplifiers 136-139 respectively, the outputs of which provide one input to each of NOR gates 118, 123, 124, and 125. The other input to these four NOR gates is provided by signal GRMB- which is amplified through amplifier 109. These four NOR gates enable instructions from the mass memory to be placed on the processor data bus when signal GRMB- goes low.

FIG. 2b schematically illustrates the RAM controller 20b. In this preferred embodiment, mass controller 20a and RAM controller 20b are formed on the same integrated circuit chip. A system clock (not shown) operating at a frequency of 4MHz has output signal PHAS- applied to amplifier 61 whose output is inverted through inverter 62 and applied as a clock input to flip flop 63. Signal PHAS- is also applied as one input to NOR gate 67. The output from inverter 62 provides one input to NOR gate 66. The output from amplifier 61 providing signal PHAS-, is inverted through inverter 93 to clock flip flop 97. Signal MREQ- from microprocessor 25a is amplified by amplifier 71 and provides the DC input to "fall-through" flip flop 63 whose Q output provides an ROW signal that is applied to RAM multiplexer 11, causing the multiplexer to address row or column depending upon the state of signal ROW.

Signal MI from microprocessor 25a is amplified by amplifier 65 and provides another input to NOR gate 66. Signal MI indicates that the microprocessor 25a is executing an operation code fetch or responding to an interrupt. Signal MREQ-, from microprocessor system 25, which signifies that the a memory request is pending, is amplified through amplifier 71 and provides still another input to NOR gate 66. The ROW signal provides the fourth input to NOR gate 66 whose output provides an input to a latch formed of NOR gates 68 and 69. The other input to latch 69 is provided by the output of amplifier 71, namely signal MREQ-. The output of NOR gate 68 provides one input to NOR gate 67 whose other input is the system clock signal PHAS-.

Signal MREQ- is amplified through amplifier 72 whose output provides an input to each of the NOR gates 81, 82, 88 and 87. The output of NOR gate 67 provides one input to each of NOR gates 81, 82 and 88.

Signal RFSH-, from microprocessor 25a is a memory refresh cycle signal inverted through inverter 74 and applied as an input to each of NOR gates 78, 79 and 86.

Address line A14 provides an input to each of AND gates 76 and 84. The signal on A14 is inverted through inverter 75 providing one input to AND gate 77 and one input to NAND gate 85. Address line A15 provides an input to each of AND gates 76 and 77, and after having been inverted through inverter 83 provides one input to AND gate 84 and one input to NAND gate 85. Address line A13 provides an input to NAND gate 89 and, inverted through inverter 91, provides an input to NAND gate 92. The outputs of NAND gates 76, 77 and 84 provide inputs to NOR gates 78, 79 and 86 respectively. The output from NAND gate 85 provides an input to NOR gate 87 and to NOR gate 94. The outputs from NOR gates 78, 79 and 86 provide inputs to NOR gates 81, 82 and 88 respectively. The output from NOR gate 87 provides one input to NAND gate 89 and one input to NAND gate 92. The output from NOR gate 94 provides the D input to flip flop 97 whose Q output provides another input to NOR gate 94. The output from NOR gate 94 provides one input to NOR gate 96. Signal WIN-(wait input) generated in the bubble memory, inverted through inverter 95 provides one input to NOR gate 96. Signal WEN, (wait enable) from microprocessor system 25, provides the 7 enable input to flip flop 97.

The outputs from NOR gates 81, 82 and 88 provide outputs RASC, RAS8 and RAS4 respectively. The output from NAND gate 92 provides output ROM0-. The output from NAND gate 89, in this preferred embodiment is not used. ROM0 selects the start-up ROM 17 and outputs RAS4, RAS8, and RASC select RAMS 12a, 12b and 12c respectively. NOR gate 96 provides a WAIT- signal for the microprocessor system 25 to slow that device down when a memory reference is made to the read-only mass memory. It is also used for other purposes such as referencing the bubble memory which is not important to this invention.

PREFERRED MODE OF OPERATION

FIGS. 3a-3i form a map, in hexadecimal code, of the contents of the read-only mass memory 14. These contents are instructions that cause the terminal to operate in a prescribed way. The instructions include a nucleus of the system, device service system, application programs, protocols, command processors, etc. Such instruction lists are well known for causing peripheral devices to operate in a desired manner. These instructions are sent to the main memory 12 via microprocessor system 25 of FIG. 1. When the microprocessor 25 recognizes that a reference must be made to the mass memory 14, then a memory reference is made. This is accomplished through the I/O data bus 32, data lines D0-D5. Referring to FIG. 2a, it can be seen that signals D0-D3 provide the actual address lines AD1, AD2, AD4 and AD8 respectively. Data lines D4 and D5 provide sync signals Io and Ii, respectively. When D5 is high, then Ii permits signals D0 through D3, by virtue of gating NAND gates 150-153, to address the mass memory 14 in four bit increments. The outputs from lines AD1, AD2, AD4 and AD8 provide inputs to an address register for the mass memory 14. For any one access, five sequences of these four bits is made to fill the register with twenty bits. In this preferred embodiment, the two most significant bits are not used. The next four bits select which of the sixteen read-only memories is to be selected. In this preferred embodiment, only five such memories (14a-14e) are present. The next fourteen bits select the particular address. The information (instructions) are then read out of the memory in four bit increments (nibbles). With signal Io high, as a result of data line D4 being high, a nibble is presented on lines AD1-AD8 and ultimately lines D0-D3. These signals are gated by the signal GRMB- which is generated by the I/O decode 30. Signal GRML- for transfer in the other direction, is also generated by I/O decode 30. This memory referencing is continued in this manner until the microprocessor system 25, through its instructions, stops the process. The buffer 29 is activated by signals IBUF- and WEB- from I/O decode 30 to permit the information on lines D0-D3 to be taken into microprocessor system 25 which then assembles these nibbles into bytes (eight bits) for transfer through buffer 28 to the main memory. Buffer 28 is enabled by signal MREQ- and its direction is set by signal RD-. FIG. 2b illustrates the circuitry for selecting which of the RAMS (12a-12c) is to be addressed. Also, the ROW signal is developed to switch from ROW address to column address. Specific addressing is accomplished through the RAM multiplexer 11 in a standard manner.

The virtual memory microcomputer architecture of this invention has been shown in connection with an input/output terminal utilizing a thermal printer, keyboard and a bubble memory. It may be used for any microcomputer, which, for economic purposes, requires a RAM for the main memory, such RAM being too small to hold the entire instruction list required, and accordingly having a read-only mass memory to hold all of the instructions required, with such mass memory available to provide instructions as they are needed through the RAM. The particular component types shown here are of course only illustrative and not limiting. Anyone of ordinary skill in the art can readily understand this invention and make substitutions of hardware without departing from the scope of the appended claims.

We claim:

1. A terminal having input/output means for transmission of electronic signals comprising:
   (a) processor means connected to control the input/output means;
   (b) main memory means connected to the input/output means for receiving electronic signals therefrom and for storing the signals as data and instructions, and also connected to the processor means for receiving data therefrom and for providing data and instructions thereto;
   (c) read-only mass memory means having processor instructions permanently stored therein, connected to the main memory means through the processor means for downloading instructions selected by the processor means, to the main memory means for subsequent transfer to the processor means when required; and
   (d) control means connected to the processor means, to the main memory means and to the read-only mass memory means for receiving main memory means and mass memory means addresses from the processor means, and for controlling the downloading instructions from the read-only mass memory means to the main memory means, through the processor means, and for controlling the flow of data and instructions between the main memory means and the processor means.

2. The terminal of claim 1 wherein the processor means comprises a microprocessor.

3. The terminal of claim 2 wherein the main memory means comprises a random access memory.

4. The terminal of claim 3 wherein the main memory means further comprises a read-only memory means for permanently storing start-up instructions for the microprocessor.

5. The terminal of claim 3 wherein the control means conprises:
   (i) main memory addressing circuitry for addressing the random access memory; and
   (ii) mass memory addressing circuitry for addressing the ready-only mass memory.

6. The terminal of claims 3, 4 or 5 wherein the random access memory has a storage capacity less than the number of instructions stored in the read-only mass memory means.

7. Microcomputer means for use in data processing apparatus, having input/output means, comprising:
   (a) a microprocessor for controlling the input/output means,
   (b) main memory means connected to the input/output means for receiving electronic signals therefrom and for storing the signals as data and instructions, and also connected to the microprocessor for receiving data therefrom and for providing data and instructions thereto;
   (c) read-only mass memory means having microprocessor instructions permanently stored therein, connected to the main memory means, through the microprocessor, for downloading instructions, selected by the microprocessor, to the main memory means for subsequent transfer to the microprocessor when required; and
   (d) control means, including addressing means, connected to the microprocessor, to the main memory means and to the read-only mass memory means for controlling downloading of instructions from the read-only mass memory means, through the microprocessor, to the main memory means and for controlling the flow of data and instructions between the main memory means and the microprocessor.

8. The microcomputer of claim 7 wherein the main memory means comprises a random access memory.

9. The microcomputer of claim 7 wherein the main memory means further comprises a read-only memory means for permanently storing start-up instructions for the microprocessor.

10. The microprocessor of claim 7 wherein the control means comprises:
    (i) main memory addressing circuitry for addressing the random access memory; and
    (ii) mass memory addressing circuitry for addressing the ready-only mass memory.

11. The microcomputer of claims 8, 9 or 10 wherein the random access memory has a storage capacity less than the number of instructions stored in the read-only mass memory means.

* * * * *